E. E. McINTYRE.
ELECTRICAL WELDING MACHINE.
APPLICATION FILED SEPT. 23, 1910.
986,845.
Patented Mar. 14, 1911.
6 SHEETS—SHEET 1.
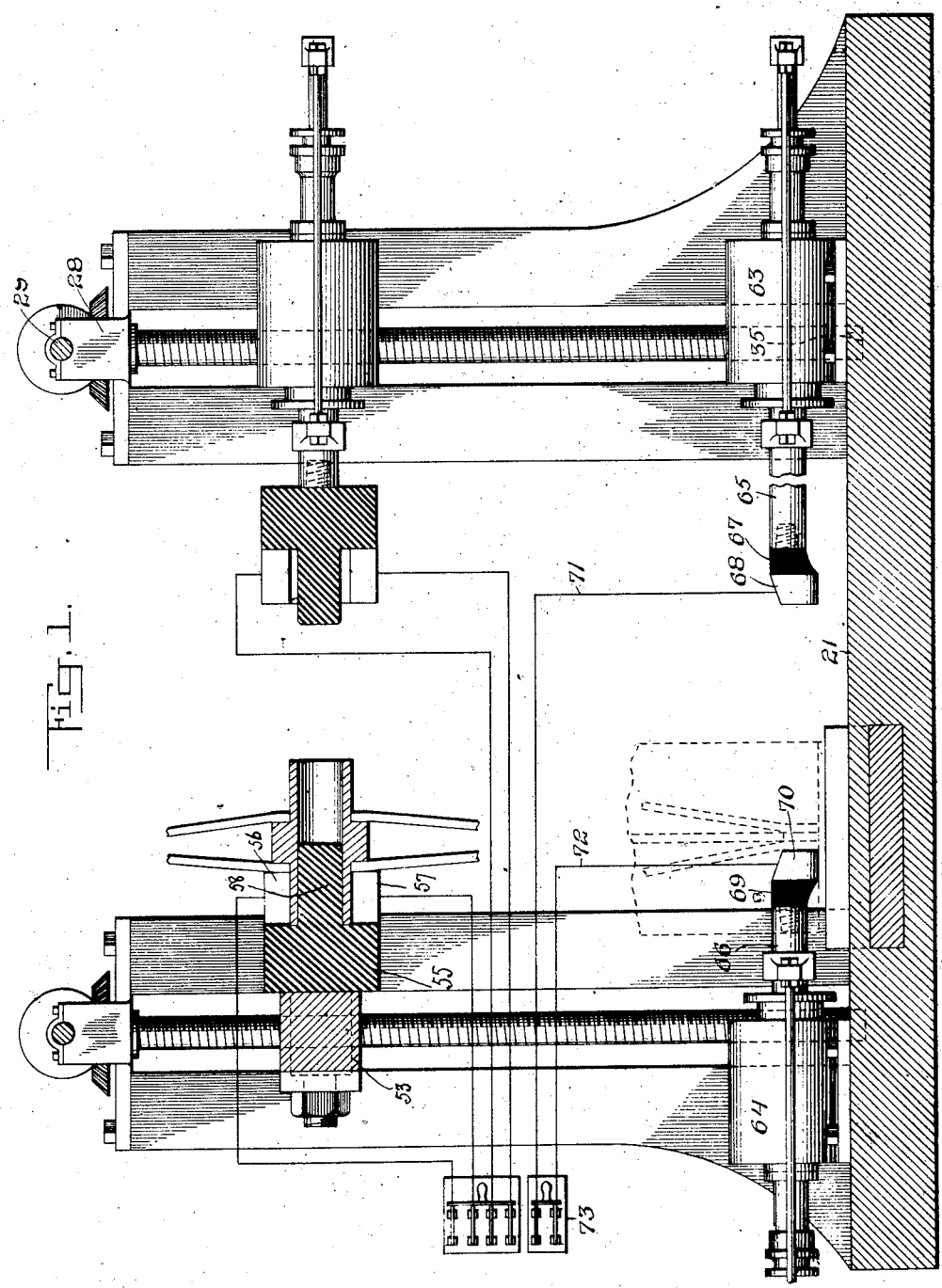
WITNESSES
INVENTOR
Elmer E. McIntyre
By
Attorneys

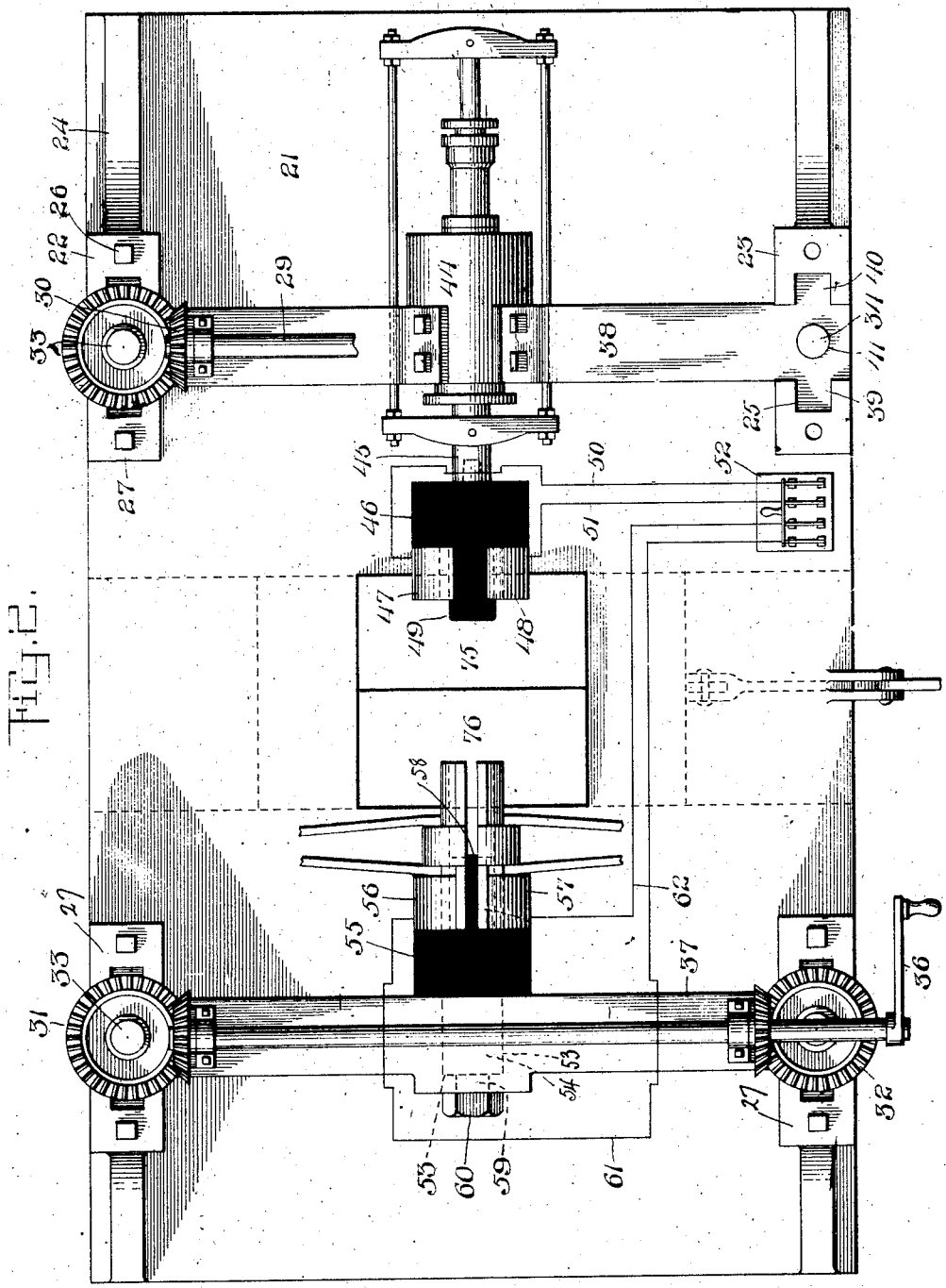

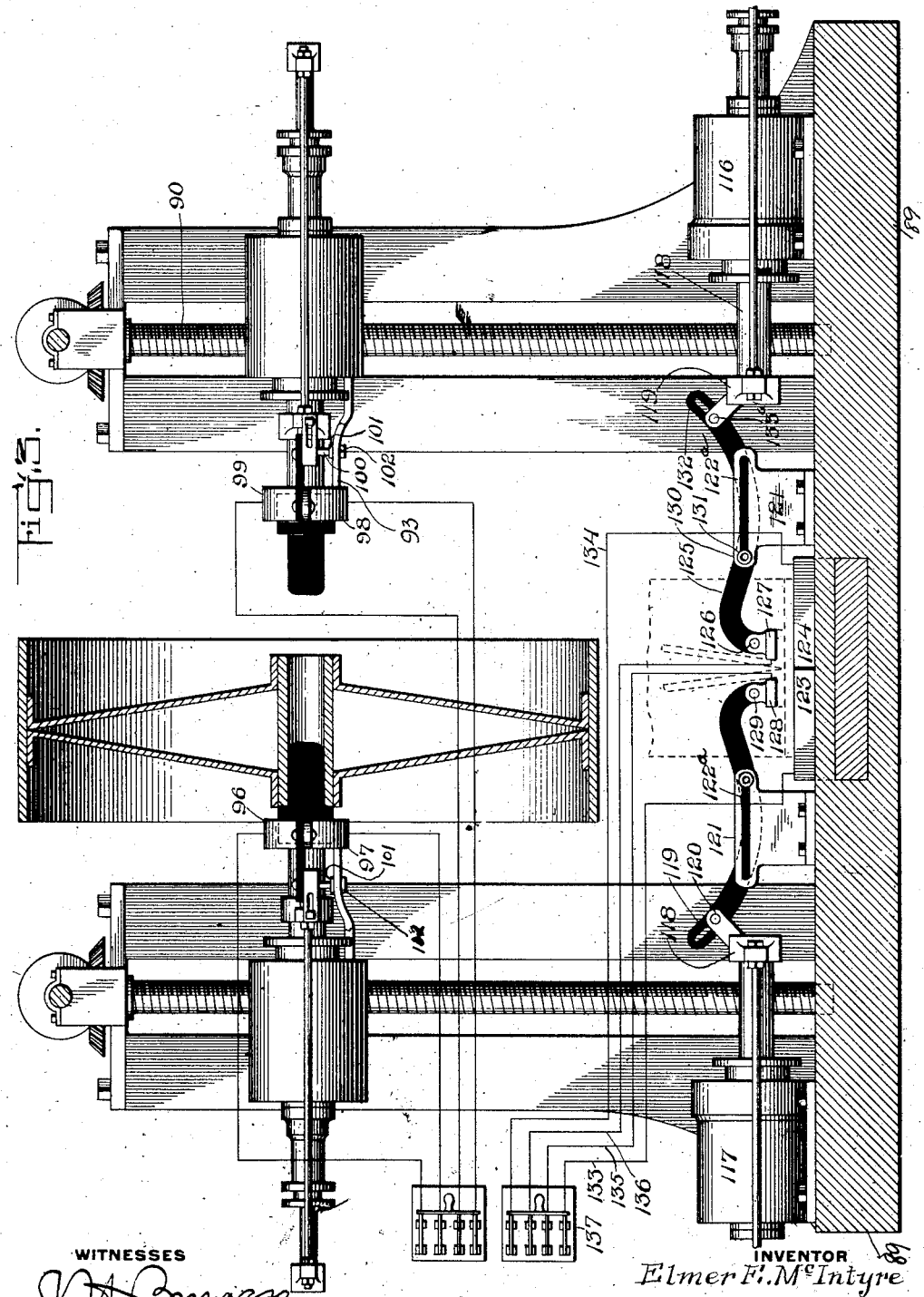

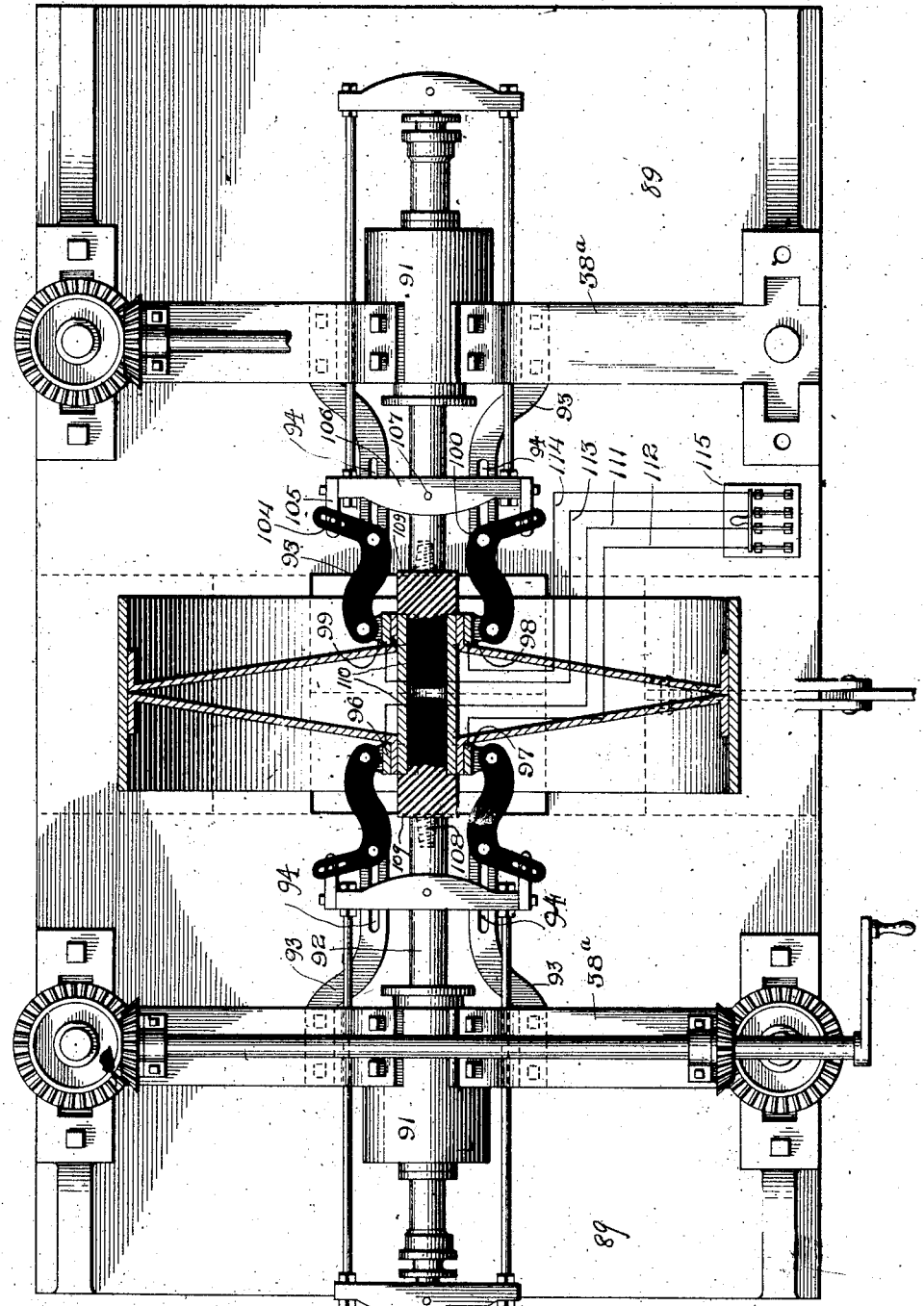

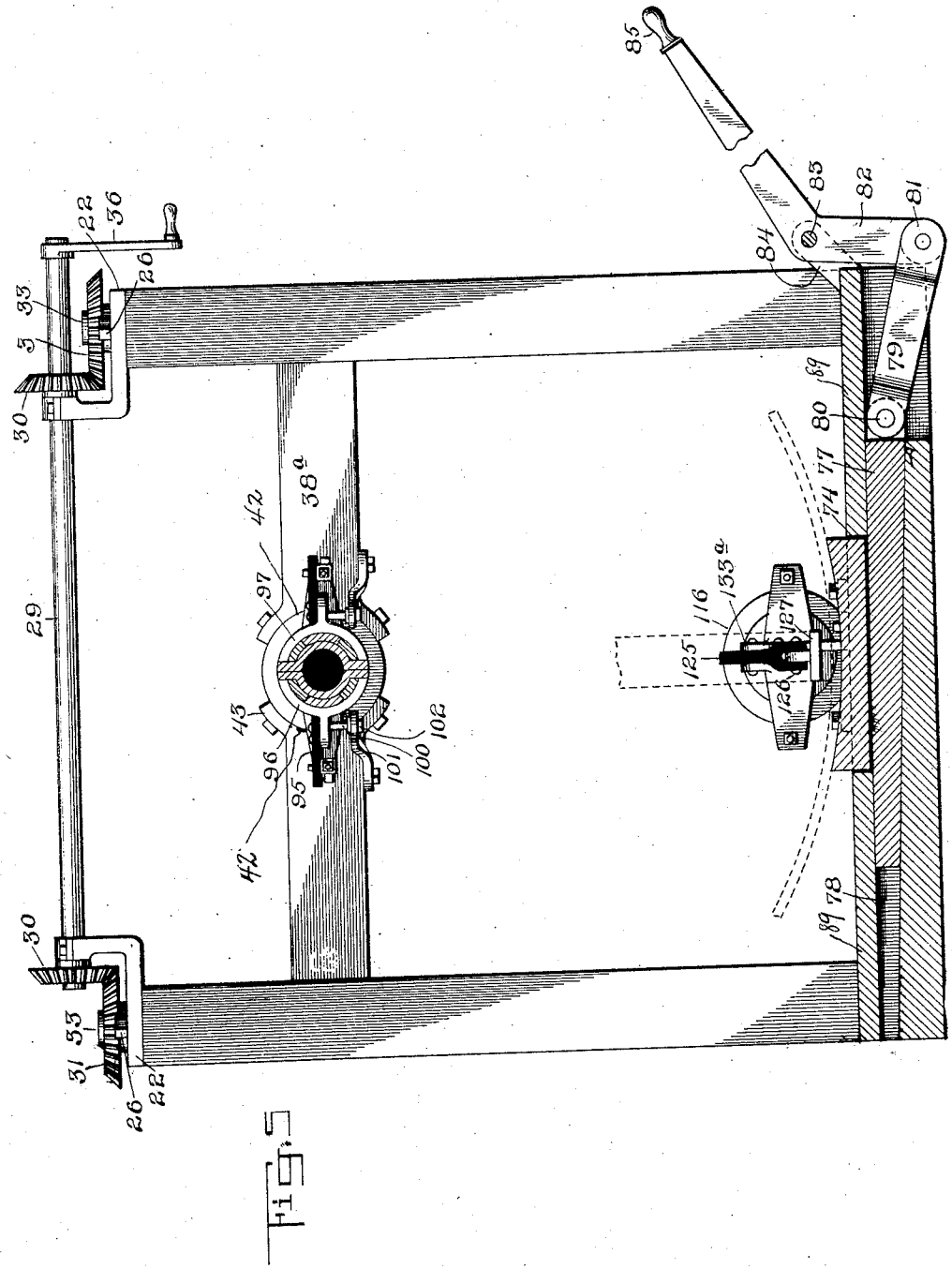

E. E. McINTYRE.
ELECTRICAL WELDING MACHINE.
APPLICATION FILED SEPT. 23, 1910.
986,845.
Patented Mar. 14, 1911.
6 SHEETS—SHEET 6.
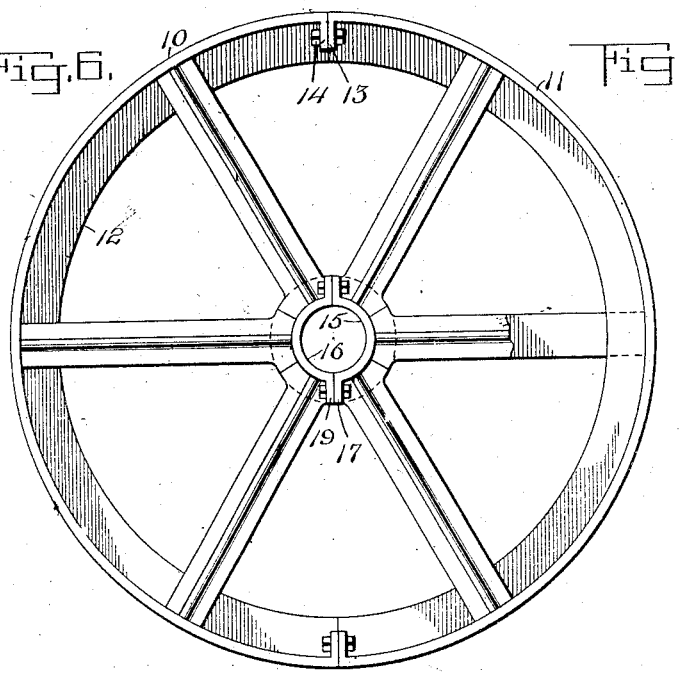
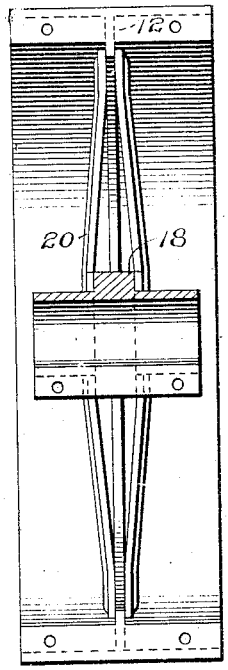
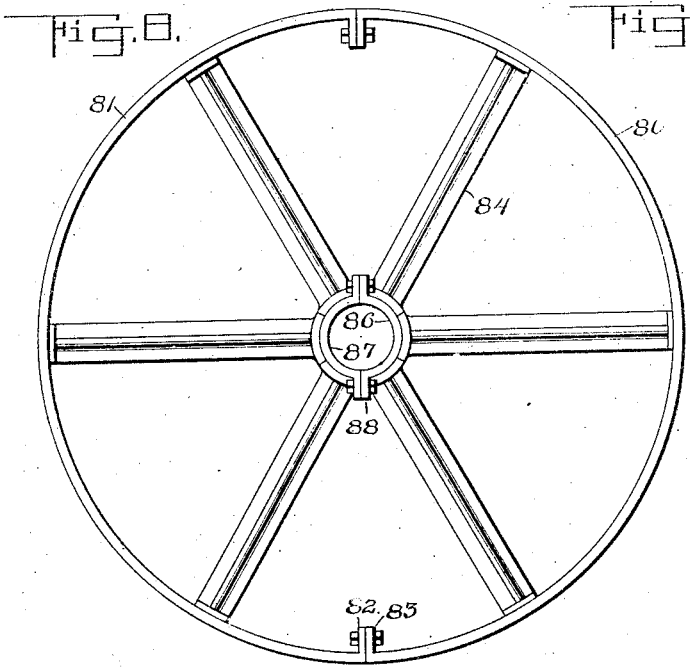
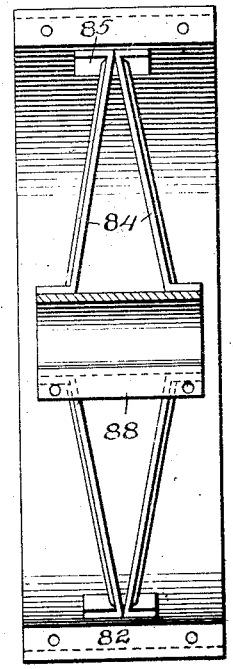
WITNESSES
INVENTOR
Elmer E. McIntyre
By
Attorneys.

UNITED STATES PATENT OFFICE.

ELMER E. McINTYRE, OF PITTSBURG, PENNSYLVANIA.

ELECTRICAL WELDING-MACHINE.

986,845.  Specification of Letters Patent.  Patented Mar. 14, 1911.

Application filed September 23, 1910. Serial No. 583,423.

*To all whom it may concern:*

Be it known that I, ELMER E. MCINTYRE, a citizen of the United States of America, residing at Pittsburg, in the county of Allegheny and State of Pennsylvania, have invented certain new and useful Improvements in Electrical Welding-Machines, of which the following is a specification, reference being had therein to the accompanying drawing.

This invention relates to an electric welding machine and has for its object to provide a machine of such class in a manner as hereinafter set forth for welding together the elements of metallic sheaves or pulleys, although the invention is designed primarily for welding the elements of a pulley or sheave, such as the spokes, rims, and the hub, yet it is to be understood that the machine is adapted for use in connection with any purposes wherein it is found applicable.

Further objects of the invention are to provide an electric welding machine which is comparatively simple in its construction and arrangement, strong, durable, efficient and convenient in its use, readily operated, adjustable for various sizes of work, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations, and modifications can be resorted to, which come within the scope of the claims hereunto appended.

In the drawings, wherein like reference characters denote corresponding parts throughout the several views: Figure 1 is an elevation partly in section of an electrical welding machine in accordance with this invention. Fig. 2 is a plan. Fig. 3 is an elevation partly in section of a modification. Fig. 4 is a plan of the construction shown in Fig. 3. Fig. 5 is a cross sectional view of the form shown in Fig. 3. Fig. 6 is a side elevation. Fig. 7 is a sectional view of the form of pulley welded by the construction of the machine illustrated in Figs. 1 and 2. Fig. 8 is a side elevation, and Fig. 9 is a sectional view of the form of pulley welded by the construction of machine shown in Figs. 3, 4, and 5.

Referring to Figs. 6 and 7 of the drawings, the pulley includes a rim formed of two sections 10 and 11, each provided with a centrally disposed inwardly extending integral rib 12 arranged approximately centrally of the inner face of its respective section. Each of the sections 10 and 11 has its ends provided with an inwardly extending flange 13, the flanges of the sections 10 opposing the flanges of the sections 11 and secured together by hold-fast devices 14. The hub of the pulley is formed with two sections, one indicated at 15 and the other at 16, the sections of the hub are semi-cylindrical in contour and each formed with lateral flanges 17 and a peripheral boss 18. The flanges 17 of the section 15 oppose the flanges 17 of the section 16 and are secured together by the hold-fast devices 19. The boss 18 of the section 15 abuts against the boss 18 of the section 16 whereby when the sections of the hub are secured together, the hub will be provided with a circumferentially extending boss. The spokes of the pulley are indicated at 20 and are arranged in pairs, the inner ends of the spokes of each pair are welded to the sides of the boss 18, while the outer ends are welded to the rib 12. By welding the spokes 20 to the rib 12 and the boss 18 the utilizing of hold-fast devices, such as rivets, nuts, and bolts, to secure the spokes in position is dispensed with.

For welding the spokes 20 to the rib 12 and the boss 18, the form of machine as shown in Figs. 1 and 2 is employed, and referring to Figs. 1 and 2 of the drawings 21 denotes a base provided with two sets of standards, each set consisting of two pairs of members, the members of one pair being indicated by the reference character 22 and the members of the other pair by the reference character 23. Each set of standards is arranged near one end of the base and the outer member of each pair of members is reinforced by the brace 24. The members of each pair are integral with or suitably connected to the base 21 and one of the members of one pair is spaced from the other member of the said pair, and each of the members of the pair has formed on its inner face a vertically disposed groove 25, which constitutes a guideway for a purpose to be presently referred to.

Mounted upon and secured to the top of each pair of members by the hold-fast devices 26 is an apertured cap piece 27 provided with an inwardly disposed angle shaped bracket 28, which constitutes a bearing for a transversely extending adjusting shaft 29, the latter being provided with a pair of beveled pinions 30 meshing with the beveled gears 31 and 32.

Arranged between the pair of members 22 is a vertically disposed adjusting screw 33 and disposed between the pair of members 23 is a vertically extending adjusting screw 34. The screws 33 and 34 extend through a cap piece 22 and are journaled in these latter and the screws are also journaled at their lower ends in the base 21, as at 35. Carried by the upper end of the screw 33 is the beveled gear 31 and connected to the upper end of the screw 34 is the beveled gear 32. One of the beveled pinions 30 is mounted upon the end of the shaft 29 and meshes with the beveled gear 31, while the other beveled pinion 30 is carried by the shaft 29 at a point removed from the other end thereof and meshes with the beveled gear 32. The beveled pinions 30 are oppositely disposed with respect to each other. Carried by the projecting end of the shaft 29 is a crank or handle 36. By revolving the shaft 29 motion is transmitted through the medium of the beveled pinions 30 and beveled gears 31 and 32 to the adjusting screws 33 and 34.

Arranged over the base 21 is a pair of adjustable carriers 37 and 38, each of said carriers at each end is provided with a pair of oppositely disposed guide lugs 39 and 40, the said lugs extending in the guide grooves 25 formed on the inner faces of the members 22 and 23. The carriers are of a length as to extend between the members of each pair so that the lugs 39 and 40 will have a sliding fit in the guide grooves 35 and each of the carriers at each end is formed with a screw threaded opening 41 for engagement with the adjusting screws. When the adjusting screws are rotated in one direction the carriers 37 and 38 will be moved upwardly, and when the screws are revolved in the opposite direction the carriers will be lowered.

The carrier 48 is formed of two sections, the inner end of each of the sections being formed with a recess 42, the wall thereof being segment shaped in contour. Each of the sections of the carrier has its inner end provided with a pair of curved flanges 43, which form a continuation of a recess 42. Interposed between the recessed ends of the sections of the carrier 38 is a double acting motive fluid operated compression mechanism 44 including a reciprocatory piston having an elongated piston rod 45, which projects from said mechanism and has detachably connected thereto a combined carrier and support of insulating material and which consists of a head 46, to which a pair of semi-cylindrical spaced welders 47 and 48 are secured. The combined support and carrier further includes a cylindrical extension 49, which projects centrally from one face of the carrier 46 and which constitutes a support for the hub of the pulley. The combined head and carrier is removable so as to provide for positioning the supports 49 of different diameters to compensate for varying diameters and lengths of hubs. Connected to the welder 47 is a circuit wire 50, and connected to the welder 48 is a circuit wire 51. The wires 50 and 51 lead to a four-pole switch 52, which is in circuit with the source of electrical energy.

The carrier 37 is formed of one piece of suitable material and is provided centrally with a socket 53, in which is detachably mounted a stem 54 of a combined carrier and support of insulating material and which includes a head 55 having the welders 56 and 57 connected thereto. The combined carrier and support further comprises a cylindrical extension 58 which constitutes a support for the hub of the pulley. The combined carrier and support is detachably secured in position so as to provide for its removal and the substitution of another one of different size, so as to provide for varying diameters and lengths of hubs. The stem 54 is formed with a cylindrical threaded protuberance 59, which projects from the carrier 37 and has mounted thereon a nut 60 whereby the combined head and carrier is detachably secured to the carrier 37. Connected to the welder 56 is a circuit wire 61, and connected to the welder 57 is a circuit wire 62, the wires 61 and 62 lead to the four-pole switch 52.

Arranged upon the base 21 is a pair of oppositely disposed double acting motive fluid operated compression mechanisms 63 and 64, the piston rod of the mechanisms 63 being indicated by the reference character 65 and the piston rod of the mechanisms 64 by the reference character 66. Detachably connected to the piston rod 65 is a carrier 67 formed of insulating material and having connected thereto a welder 68. Detachably connected to the piston rod 66 is a carrier 69 of insulating material and which has secured thereto a welder 70. By detachably connecting the carriers 67 and 69 to the piston rods 65 and 66, provision is made for their removal and the substituting therefor of carriers provided with different sizes and shapes of welders. Leading from the welder 68 is a circuit wire 71, and leading from the welder 70 is a circuit wire 72, the wires 71 and 72 are connected to a two-pole switch 73, which is in circuit with the source of electrical energy. The base 21 (best shown in Fig. 5) is provided with an opening 74 in its top, in which is seated an insulated sectional support, the sections of the support being indicated by the reference characters 75 and 76, and upon which is adapted to be mounted the rim of the pulley. The support for the rim is vertically adjustable through the medium of a wedge 77 traveling in an opening 78 formed in the base 21. The wedge 77 is shifted through the medium of a link 79 which is pivotally connected at one end, as at 80, to the wedge and at its other end, as at 81, to a shifting lever 82 fulcrumed, as at 83, upon a bracket 84 mounted upon the base 21. The lever 82 is provided with a handle 85.

The operation of the welding is as follows: The hub sections of the pulley are clamped together by an insulated clamp, the spokes are clamped in position against the boss of the hub by an insulated clamp and the rim is connected to the spokes by an insulated clamp. Any suitable clamps capable of performing the function of coupling the elements of the pulley, sheave, or wheel together can be utilized, and it is thought unnecessary to show any form of clamp. The work, i. e., pulley, sheave, or wheel, is then mounted upon the support 58 after which the mechanism 44 is thrown into operation so as to shift the piston rod 45 outwardly to cause the support 49 to enter the hub of the work and to further clamp the inner ends of the spokes between the bosses and the welders. The switch 52 is closed whereby the current will be supplied to the welders 47, 48, 56, and 57 and weld the inner ends of the spokes to the hub sections. Prior to the positioning of the work upon the support 58, the latter and the support 49 are vertically adjusted to provide for the diameter of the work. After the inner ends of the spokes are welded to the hub, the current is shut off and the supports 49 and 58 lowered to position the rim upon the sectional support in the opening 74. After the rim has been positioned upon the sectional support in the opening 74 of the base 21, the mechanisms 63 and 64 are thrown into operation whereby the welders 68 and 70 will be brought into engagement with the outer ends of a pair of spokes to clamp said outer ends against the rib 12. The elements 75 and 76 are then adjusted by the wedge 77 so that the rim will be held snugly against the outer ends of the spokes. The switch 73 is then closed and the current passes to the welders 70 through the spokes and rib to the welders 68 back to the switch. The outer ends of the spokes during the foregoing operation, that is to say, on the passage of the current will be welded to the rib 12 of the rim. After one pair of spokes have been welded to the rib, the current is shut off and the welders 68 and 70 withdrawn and the pulley is revolved on the supports 49 and 58, the welders 47 and 48, 56 and 57 being withdrawn sufficiently to allow of the revolving of the pulley, to position another pair of spokes in the path of the welders 68 and 70, after the pair of spokes has been positioned the welders 68 and 70 are then brought into engagement with the outer ends of the spokes and the current turned on, whereby the outer ends of the spokes are welded to the rib, this operation is repeated until all of the pairs of spokes have been welded to the ribs. If desired, the welding of the outer end of one pair of spokes can be had simultaneously with the welding of the inner ends of the spokes to the hub and in this connection we stated that the pulley is positioned so that such action can be had.

In Figs. 8 and 9 of the drawings is illustrated the form of pulley welded by the construction shown in Figs. 3, 4, and 5, and which consists of a rim formed of two sections 80 and 81, the ends of each section being formed with an inwardly extending flange 82, the flanges of one section being secured to the flanges of the other sections by the hold-fast devices 83. The inner face of each of the sections is uninterrupted throughout. The spokes of the pulley are indicated by the reference character 84 and are arranged in pairs and each has each of its ends provided with a right angularly disposed flange 85. The hub of the pulley is formed of two sections 86 and 87, each semicylindrical in contour and provided with a longitudinally extending flange 88, the flanges of the section 84 abutting against the flanges of the section 87 and coupled together by the hold-fast devices 88. The periphery of each of the sections of the hub is uninterrupted throughout and is adapted to have welded thereon the right angularly disposed flanges at the inner ends of the spokes. The inner face of each of the sections of the rim is adapted to have welded thereto the right angularly disposed flanges at the outer ends of the spokes. The flanges at the inner ends of the spokes when welded to the hub sections are flush with the ends of the hub sections. The spokes when welded in position have their outer ends abutting against each other so that each pair of spokes when set up with respect to the rim and hub will be substantially V-shaped. Prior to the welding of the elements of the form of pulley shown in Figs. 8 and 9 together, the said elements are clamped together by any suitable form of insulated clamp and after being clamped or being mounted on the machine for the purpose of being welded together.

Referring to Figs. 3, 4, and 5 of the drawings which illustrate the form of machine for welding spokes of the form of pulley as shown in Figs. 8 and 9 to the rim and hub 89 denotes a base which is provided with two sets of standards of the same construction as that referred to in connection with Figs. 1 and 2, like reference characters being employed. Arranged between each pair or pairs of sets of standards are adjusting screws 90 and each pair of screws has connected thereto a carrier 38ᵃ of the same construction as the carrier 38, like reference characters being applied to said carriers. Each carrier has secured thereto double acting motive fluid operated compression mechanisms 91, said mechanisms 91 being oppositely disposed with respect to each other and each including an elongated piston rod 92. Projecting inwardly from each of the carriers 38ᵃ is a pair of inwardly curved arms 93 formed with an elongated slot 94. Slidably and pivotally supported upon the arms 93 are the actuating members 95 four in number and each of which has its inner end pivotally attached to the welder, the welders being indicated by the reference characters 96, 97, 98, and 99. The members 95 are connected to the arms 93 by pins 100, which extend through a slide in the slots 94 of the arms 93. The pins 100 are slidably connected to the arms 93 by the shoulder 101 and the nut 102, the shoulder 101 riding upon the upper face of the arm 103. Each of the actuating members 95 has a pin and slot connection at one end, as at 104, with an adjustable support 105 carried by a cross head 106, which is fixed at 107 to the piston rod 92. The cross head moves with the piston rod 92 and on the operative stroke of the piston rod the members 95 are rocked so as to clamp the inner flanges of the spokes against the sections of the hub. Each of the piston rods 92 is provided with a socket at its inner end which detachably engages the stem 108 of an insulated head 109 provided with an insulated cylindrical extension 110, which constitutes a support for the hub of the pulley. Leading from the welders 96 is a circuit wire 111, from the welder 97 is a circuit wire 112 from the welder 98 a circuit wire 113 and from the welder 99 is a circuit wire 114. The wires 111 to 114 lead to a four-pole switch 115, which is in communication with the source of electrical energy.

Arranged upon the base 89 below the fluid pressure operative mechanisms 91 is a pair of oppositely disposed double acting motive fluid operated compression mechanisms 116, 117, each including a piston rod 118 having attached thereto a cross head 119 from which projects an inclined arm 120.

Mounted upon the base 89 at each side of the opening 74 and approximately centrally of the base is a vertically disposed bracket 121 provided at its top with a longitudinally extending elongated slot 122ᵃ. In Figs. 3, 4, and 5, the elements 75 and 76 which are mounted in the opening 74 not only constitute supports but also a pair of welders which are suitably insulated from the base 89 and which are indicated by the reference characters 122, 123, and 124. These welders are adjusted in the same manner as the elements 75 and 76. The reference character 125 indicates actuating members formed of insulating material, two of these members are employed and one has a welder 126 pivotally connected, as at 127, to its inner end and the other has a welder 128 pivotally connected, as at 129, to its inner end. Each of the members 125 is slidably and pivotally connected to a bracket 121 through the medium of a pin 130, which extends through the slot 122, the pin 130 provided with a nut 131 to prevent separation of the member 125 from its respective bracket 121. The outer end of each of the members 125 is provided with an elongated slot 132, through which extends a pin 133ᵃ carried by the inclined arm 120. By coupling up each of the members 125 in a manner as stated with the bracket 121 and with the piston 118, when the piston moves toward the center of the base the arm 125 is carried in a like direction and also rocks in its respective bracket so that the welder carried thereby will engage the flange at the outer end of the spoke and clamp it to the rim. The welders carried by the arms 125 also clamp the outer ends of the spokes together prior to the welding of the flanges at the outer ends of the spokes to the inner face of the rim. Leading from the welder 123 is a circuit wire 133 leading from the welder 124 is a circuit wire 134, leading from the welder 128 is a circuit wire 135 and leading from the welder 127 is a circuit wire 136. The wires 133 to 136 are connected to a four-pole switch 137, which is in communication with the source of electrical energy.

It will be assumed that the pulley is positioned in a manner as shown in dotted lines in Fig. 3, the outer end of the spokes being shown in abutting position and clamped to the inner face of the rim, the switch being closed, the current will pass to the welder 128 through the rim to the welder 123 and back to the switch and also to the welder 127 through the rim to the welder 124 back to the switch, this will cause the welding of the outer flanges of the spokes to the rim. During the passage of the current the mechanisms 116 and 117 are maintained in such position as to cause the welders to clamp the flanges of the spokes to the rim

What I claim, is:

1. An electric welding machine comprising a base, a pair of work supporting elements each including a pair of welders adapted to engage the work and have an electrical current supplied thereto, carriers for said work supporting elements, means for vertically adjusting the carriers with respect to the base to provide for the mounting of various sized work upon the supporting elements, a fluid pressure operated means for clamping the work between the pairs of welders, and means for establishing an electrical circuit through the welders.

2. An electric welding machine comprising a base, vertically adjustable work supporting elements including welders adapted to engage the work and have an electrical current supplied thereto, carriers for said elements, means for vertically adjusting the carriers with respect to the base to provide for the mounting of various sized work upon said elements, fluid pressure operated means supported by the carriers and connected with the welders for clamping the work between the welders when said means is operated in one direction and to shift the welders from the work when operated in the other direction, means whereby an electrical current is supplied to the welders.

3. An electric welding machine comprising a base, vertically adjustable and longitudinally shiftable welders supported upon the base and adapted to engage the work and have an electrical current supplied thereto, fluid pressure operated means connected to and vertically movable with the welders and adapted when operated in one direction to cause the welders to shift longitudinally toward and clamp the work and when operated in the opposite direction to withdraw the welders to release the work, and means for supplying an electrical current to the welders.

4. An electric welding machine comprising a base, a pair of work holder carriers vertically adjustable with respect to said base thereby providing for various sized work, a removable work holder connected to and vertically movable with each of the carriers and each including welders adapted to engage the work and have an electrical current supplied thereto, means whereby the work is clamped between the welders, and means whereby an electrical current is supplied to the welders.

5. An electric welding machine comprising a base, a pair of work holder carriers vertically adjustable with respect to said base thereby providing for various sized work, a removable work holder connected to and vertically adjustable with each of the carriers and each including welders adapted to engage the work and have an electrical current supplied thereto, means whereby the work is clamped between the welders, means whereby an electrical current is supplied to the welders, and welding mechanisms arranged below the carriers.

6. An electric welding machine comprising a base, a pair of vertically adjustable carriers mounted thereon and adjusted with respect thereto, work supports including welders adapted to engage the work and have an electrical current supplied thereto, means for connecting the supports to the carriers, whereby the holders will be vertically adjusted with the carriers to provide for work of various sizes, means whereby the work is clamped between the welders, means whereby an electrical current is supplied to the welders, and fluid pressure operated welding mechanisms arranged below the carrier and adapted to be thrown in circuit with a source of electrical energy.

7. An electric welding machine comprising adjustable welders adapted to engage the work and have an electrical current supplied thereto, means whereby the work is clamped between the welders, means whereby an electrical current is supplied to the welders, and fluid pressure operated welding mechanisms arranged below said welders and adapted to have an electrical current supplied thereto.

8. An electric welding machine comprising work holders each including welders adapted to engage the work and have an electrical current supplied thereto, means whereby the welders are maintained in engagement with the work under a state of compression, and means for supplying an electrical current to the welders while under a state of compression whereby the work is welded.

9. An electric welding machine comprising work holders each including welders adapted to engage the work and have an electrical current supplied thereto, means whereby the welders are maintained in engagement with the work under a state of compression, means for supplying an electrical current to the welders while under a state of compression whereby the work is welded, and means whereby the work holders are vertically adjustable.

10. An electric welding machine comprising work holders each including welders adapted to engage the work and have an electrical current supplied thereto, means whereby the welders are maintained in engagement with the work under a state of compression, means for supplying an electrical current to the welders while under a state of compression whereby the work is welded, supporting means for the work arranged below the work holders, fluid pressure operated welding devices arranged in operative relation with respect to said supporting means for holding the work thereon under a state of compression, and means for supplying an electrical current to the welding devices to weld the work.

11. An electric welding machine comprising work holders each including welders adapted to engage the work and have an electrical current supplied thereto, means whereby the welders are maintained in engagement with the work under a state of compression, means for supplying an electrical current to the welders while under a state of compression whereby the work is welded, supporting means for the work arranged below the work holders, fluid pressure operated welding devices arranged in operative relation with respect to said supporting means for holding the work thereon under a state of compression, means for supplying an electrical current to the welding devices to weld the work, and means for adjusting said supporting means.

12. An electrical welding machine comprising supporting elements for the work including welders adapted to engage the work and have an electrical current supplied thereto, means for vertically adjusting the supporting elements to provide for work of varying sizes, fluid pressure operated means movable longitudinally for clamping the work between the welders, and means whereby an electrical current is supplied to the welders.

In testimony whereof I affix my signature in the presence of two witnesses.

ELMER E. McINTYRE.

Witnesses:
 KARL H. BUTLER,
 VICTOR RICHTMANN.